United States Patent Office 3,052,282
Patented Sept. 4, 1962

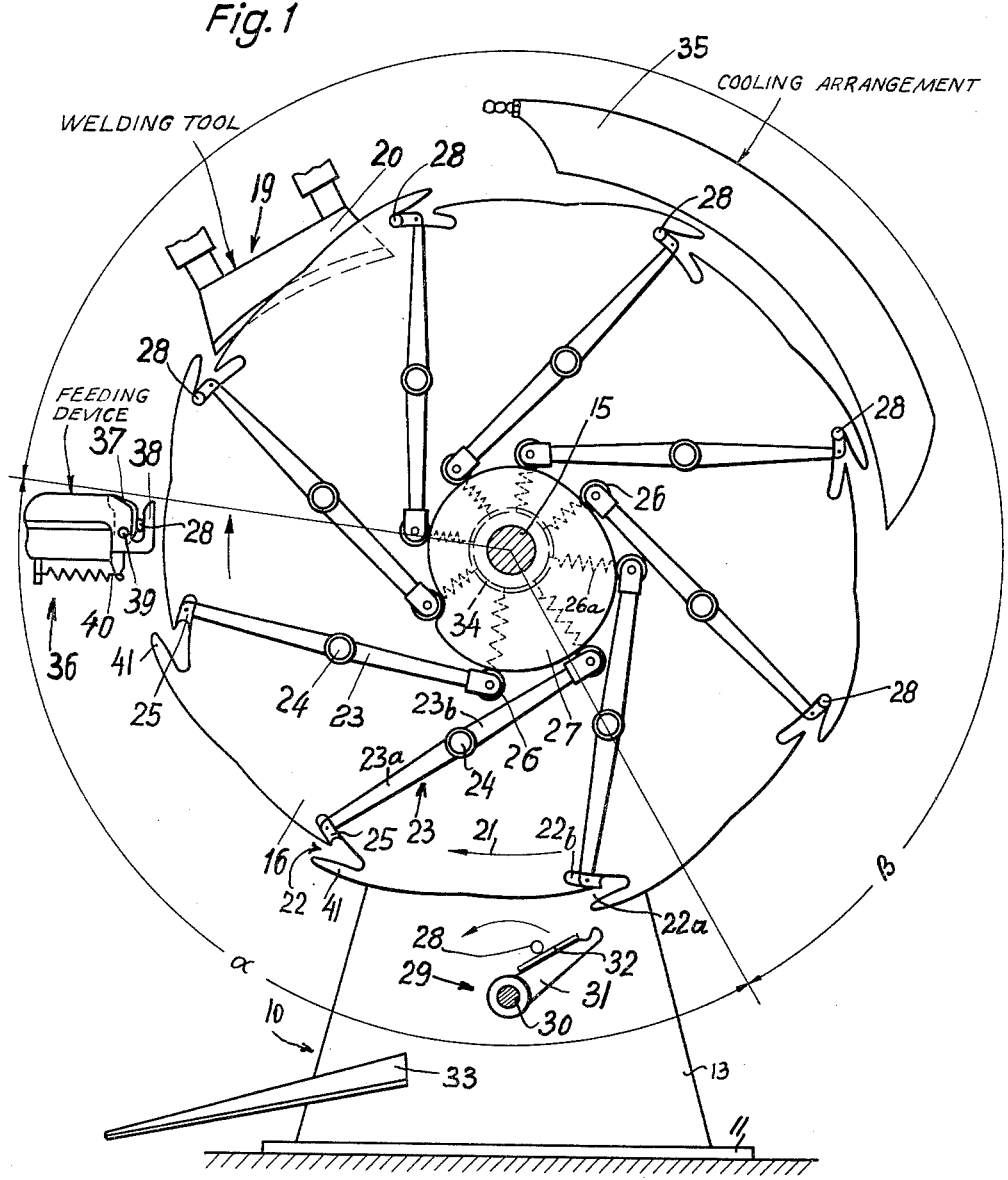

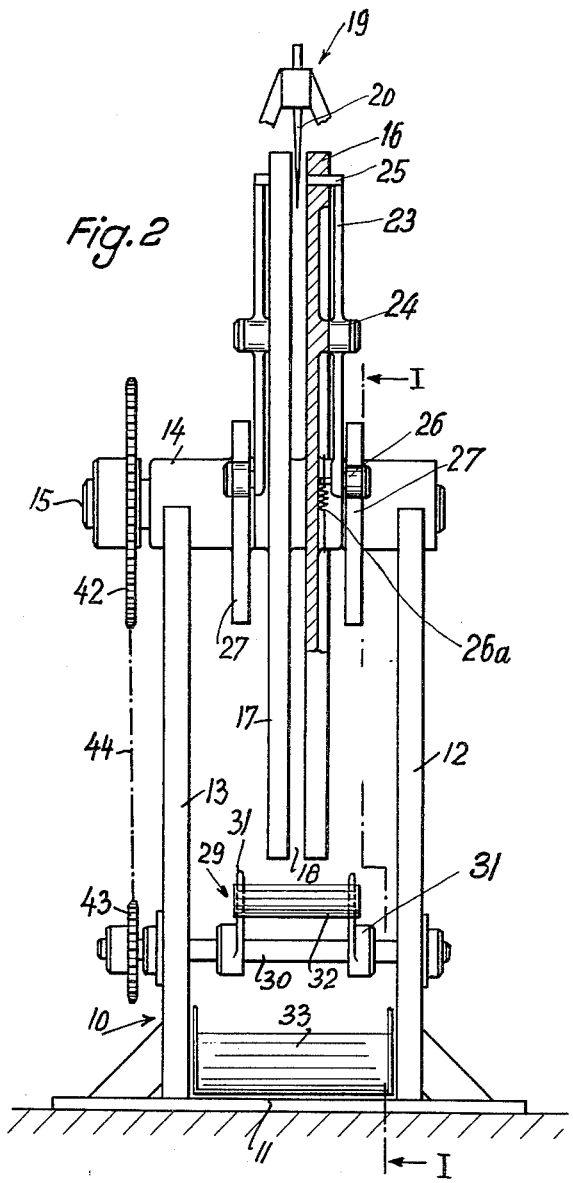

3,052,282
APPARATUS FOR CUTTING AND WELDING TUBULAR WORKPIECES OF THERMOPLASTIC MATERIAL
Carl Brückhäuser and Günther Lausen, Nordenham, Oldenburg, Germany, assignors to Norddeutsche Seekabelwerke Aktiengesellschaft, Nordenham, Oldenburg, Germany
Filed Feb. 23, 1961, Ser. No. 91,093
5 Claims. (Cl. 156—515)

The present invention relates to an apparatus for heat-sealing the ends of tubular workpieces, and more particularly to an apparatus which cuts a tubular workpiece in two halves and simultaneously welds the end portions of the halves adjacent to the cut so as to obtain two tubes each of which has a closed end.

Heretofore, a tubular pouch or bag of thermoplastic material, such as polyethylene, was formed by shirring or pleating one end of a tubular workpiece and by sealing the end under application of heat and pressure. It is also known to seal an intermediate portion of a thermoplastic tube and to simultaneously cut through the sealed intermediate portion so as to obtain two halves with sealed ends. Such combined cutting and heat-sealing operation may be carried out with non-perforated and/or with net-like tubular workpieces.

The apparatus heretofore utilized for cutting and simultaneous welding of tubular workpieces comprises a pair of closely adjacent stationary clamping jaws and a heatable welding tool which is movable through the space between the jaws. The welding area is cooled by air or by contact with a cooled metallic body. A serious drawback of such apparatus is that their output is too low because a welded workpiece can be removed from the fixed jaws only after the completion of the cutting, welding and cooling operations. The length of such operations depends to a large extent on the thickness of the workpiece so that the output of the apparatus, too, is a function of the wall thickness of the thermoplastic tube.

Accordingly, it is an important object of the present invention to provide a combined cutting and welding apparatus for tubular workpieces consisting of heat-sealable thermoplastic material which is constructed and assembled in such a way that the cooling of a preceding workpiece need not be terminated at the time when the next workpiece is brought into contact with the cutting and welding instrumentalities so that the output of the apparatus is a multiple of the output of heretofore known machines for similar purposes.

Another object of the invention is to provide an apparatus of the just outlined characteristics whose output is not affected by the length of time necessary for the cutting, welding and/or cooling operations, and which is less dependent on or is entirely independent from the thickness of the material of which the workpieces consist.

A further object of the invention is to provide an apparatus whose operation is fully automatic, which is capable of automatically moving the workpieces through the various treating stations and is also adapted to automatically eject the finished articles, which is reliable in operation, which occupies little space, and which requires little or no supervision when in actual use.

With the above and certain other objects in view, the invention resides in the provision of an apparatus in which the workpieces consisting of a heat-sealable thermoplastic material are moved in a predetermined path with respect to a stationary welding tool and with respect to a stationary cooling arrangement. The length of the cutting tool determines the length of the welding and cutting operation, and the length of the cooling action upon the welded joints depends on the thickness of the thermoplastic tubes, on the speed at which the workpieces are moved with respect to the cooling arrangement, the cooling effect of the arrangement, and certain other factors.

The workpieces are preferably moved in a circular path and are held by supporting means comprising a pair of closely adjacent rotary disks which carry clamping means for properly retaining the workpieces prior to and after the workpieces are subjected to the cutting and heat-sealing action of the welding tool.

Certain other features of the invention reside in the provision of specially constructed and mounted clamping elements for the workpieces, in the provision of means for automatically feeding the workpieces to the supporting means, and in the provision of means for automatically collecting and transferring the workpieces after the workpieces have completed their travel through the cutting, welding and cooling stations.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is a somewhat schematic partly elevational and partly sectional view of the combined cutting, welding and cooling apparatus, the section being taken along the line I—I of FIG. 2, as seen in the direction of arrows; and FIG. 2 is an end view of the apparatus with certain parts broken away and with certain parts omitted for the sake of clarity.

Referring now in greater detail to the drawings, there is shown a combined cutting, welding or heat sealing and cooling apparatus which comprises a frame 10 including a base plate 11 and two uprights 12, 13 whose upper ends support bearings 14 for a horizontal drive shaft 15. This shaft is drivingly connected with two closely adjacent concentric disks 16, 17 which together constitute the supporting means for the tubular workpieces 28 and which are located between the uprights 12, 13. The disks 16, 17 define between themselves a gap 18 into which extends the elongated cutter blade 20 of a stationary heating or welding tool 19 which may be secured to the frame 10 or to another stationary structure, not shown. The preferably concave edge of the cutter blade 20 makes an acute angle with the adjacent portion of the circular path in which the workpieces are moved by the disks 16, 17 so that the cutting edge penetrates gradually into and simultaneously heats the median portions of the workpieces which extend across the gap 18. It is assumed that the disks 16, 17 are rotated in the direction indicated by the arrow 21, i.e. clockwise as viewed in FIG. 1. The peripheral portions of these disks are formed with preferably uniformly spaced transversely aligned recesses 22. Each recess has a first or outer portion 22a which opens into the periphery of the respective disk and a second or inner portion 22b whose inner side is preferably bounded by an arcuate wall whose center of curvature coincides with the axis of the drive shaft 15. In the illustrated embodiment, each disk is formed with eight uniformly spaced recesses 22 and each thereof carries eight retaining members in the form of two-armed levers 23 whose pivots 24 are disposed on the periphery of a circle concentric with the respective disk. The outer arm 23a of each lever 23 carries at its end a clamping element 25 which extends into the inner portion 22b of the respective recess, and the inner arm 23b of each lever 23 carries at its end a follower in the form of a roller 26 which tracks the face of one of two plate cams 27 here shown in the form approximating that of so-called heart cams. The cams 27 are stationary, i.e. they may be rigidly secured to the bearings 14 at the outer sides of the respective disks so that, when the drive shaft 15 rotates, the followers 26 travel along the faces of the respective cams and rock the levers 23 in a predetermined rhythm in order to move the clamping elements 25 between two spaced positions in the respective recesses 22. In one of these end positions, each clamping element 25 bears against a tubular workpiece 28 by being moved anticlockwise, as viewed in FIG. 1, so as to move from the inner end of the respective inner portion 22b toward the junction of this portion with the outer portion 22a. In the other end position, the clamping elements 25 are moved toward the inner ends of the respective recess portions 22b so that a workpiece 28 previously engaged by a pair of transversely aligned clamping elements 25 is free to drop by gravity from the respective transversely aligned recesses 22 onto a transferring device 29 which is located in advance of the welding tool 19. This transferring device comprises a horizontal shaft 30 which is rotatably mounted in the uprights 12, 13 beneath the drive shaft 15, a pair of spaced radial carriers 31 connected for rotation with the shaft 30, and a plate 32 secured to the carriers 31 and adapted to intercept the separated halves of a workpiece 28 and to transfer the same onto a conveying device such as an inclined chute 33, an endless conveyor, or the like.

The levers 23, and more particularly the followers 26 are permanently biased into engagement with the respective cam faces by resilient elements 26a here shown as helical springs each of which has its outer end connected to the inner arm 23b of the respective lever 23 and each of which has its inner end anchored in one of two annular members 34 which are secured to and rotate with the drive shaft 15.

The improved apparatus further comprises an elongated cooling arrangement 35 which is adjacent to the predetermined circular path of the workpieces and is located past the welding tool 19 but in advance of the transferring device 29, as viewed in the direction in which the disks 16, 17 rotate, and whose purpose is to cool the softened and pressed-together end portions of the workpieces 28 at both sides of the cut formed in the workpieces by the edge of the cutter blade 20. This cooling arrangement may be of any suitable design, it may comprise a series of nozzles for blowing cool air against the traveling workpieces, or it may sprinkle the heat-sealed end portions with a liquid coolant. The length of the cooling arrangement is sufficient to insure that a strong and reliable joint is formed at the adjacent ends of the halved workpieces 28 before the workpieces are discharged by the clamping elements 25 to be transferred onto the conveying means 33.

The operation of the improved apparatus is as follows:

The workpiece 28 may be obtained by cutting an elongated tubular blank into a series of shorter sections. The cutting of a blank into sections or workpieces 28 may be performed manually or in a suitable machine, not shown. In the next step, the workpieces 28 are automatically or manually transferred from the source to a feeding device 36 which consecutively delivers workpieces to the supporting disks 16, 17 and which comprises a stationary holder 37, a rockable gripping jaw 38 pivotally connected to the holder 37 by a pin 39, and a resilient element 40 which permanently biases the gripping jaw 38 in anticlockwise direction, as viewed in FIG. 1, so that a workpiece 28 received in the space between the holder and the jaw is releasably supported in the circular path of the hook-shaped projections 41 formed by the recess portions 22a in both disks 16, 17. It will be noted that the configuration of the peripheral faces on the cams 27 is such that the clamping elements 25 are located in the innermost zones of the inner recess portions 22b while the levers 23 travel in the arcuate path indicated by the angle α and that the levers 23 move their respective clamping elements 25 into engagement with the workpieces 28 while they travel in the arcuate path indicated by the angle β. During each revolution of the disks 16, 17, the levers 23 are rocked twice, namely in anticlockwise direction immediately after their clamping elements pass along the feeding device 36, and in clockwise direction shortly before their clamping elements reach the transferring device 29.

The aligned projections 41 of the disks 16, 17 which advance toward the feeding device 36 engage a workpiece 28 held in the space between the holder 37 and the jaw 38 and, as the disks continue their movement in the direction of the arrow 21, the workpiece slides along the outer walls of the respective outer recess portions 22a and are immediately engaged by two clamping elements 25 so that, when advanced into contact with the heated cutter blade 20, each workpiece is properly held by two clamping elements located at opposite sides of the blade. The blade 20 then heats and its concave edge simultaneously penetrates into the workpiece so that the end portions of the halved workpiece at both sides of the cut formed therein are melted or softened and are simultaneously pressed together or deformed so as to become closed or sealed. As soon as the combined cutting and heating or welding step is completed, the halves of the workpiece are subjected to the action of the cooling arrangement 35 and the two joints harden before the halves of the workpiece reach the transferring device 29. Shortly before reaching the carriers 31, the levers 23 are rocked in clockwise direction so that their clamping elements 25 release the halves of the workpiece and the halves descend by gravity onto the plate 32 to be transferred onto the chute 33.

The means for rotating the drive shaft 15 and the lower shaft 30 comprises a driver gear 42 on the shaft 15, driven gear 43 on the shaft 30, and a chain 44. The means for rotating the driver gear 42 may comprise an electric motor and a suitable reduction gearing, not shown. The transmission ratio between the gears 42, 43 is selected in such a way that the plate 32 is in proper position to transfer the welded halves of a workpiece 28 immediately after a pair of transversely aligned levers 23 is rocked in clockwise direction.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for cutting through and for simultaneously welding the end portions of tubular workpieces consisting of heat-sealable thermoplastic material, said apparatus comprising, in combination, means for supporting and for consecutively moving the workpieces in a circular path, said supporting means comprising a pair of closely adjacent disks defining between themselves a gap and including retaining means for releasably holding two spaced portions of the workpieces in such a manner that a median portion of each workpiece extends across said gap; stationary welding means comprising a cutter blade mounted in said gap and extending into said path for forming a cut through the median portions of the workpieces and for simultaneously heat-sealing the workpieces at both sides of the cut; and stationary cooling means adjacent to said path and located past said welding means for cooling the heat-sealed portions of the workpieces.

2. An apparatus for cutting through and for simultaneously welding the end portions of tubular workpieces consisting of heat-sealable thermoplastic material, said apparatus comprising, in combination, a pair of closely adjacent concentric disks for supporting and for consecutively moving the workpieces in a circular path, said disks defining between themselves a gap and each formed with transversely aligned peripheral recesses for removably receiving the workpieces; frame means for rotatably supporting said disks; means for driving said disks at the same rotational speed; a plurality of retaining means mounted on each of said disks and each comprising a clamping element extending into one of said recesses for releasably retaining a workpiece therein; stationary welding means comprising a cutter blade adjacent to said circular path and extending into said gap for forming a cut through the workpieces and for simultaneously heat-sealing the workpieces at both sides of the cut; and stationary cooling means adjacent to said path and located past said welding means for cooling the heat-sealed portions of the workpieces.

3. An apparatus for cutting through and for simultaneously welding the end portions of tubular workpieces consisting of heat-sealable thermoplastic material, said apparatus comprising, in combination, a pair of closely adjacent concentric disks for supporting and for consecutively moving the workpieces in a circular path, said disks defining between themselves a gap and each formed with transversely aligned peripheral recesses for removably receiving the workpieces; frame means for rotatably supporting said disks; means for driving said disks at the same rotational speed; a plurality of two-armed levers pivotally mounted on each of said disks, each of said levers having an outer arm comprising a clamping element extending into one of said recesses for releasably retaining a workpiece therein and an inner arm; fixed cam means mounted in said frame means; and a follower provided on the inner arm of each lever for tracking said cam means and for thereby rocking said levers in a predetermined rhythm whereby the clamping elements retain the workpieces while the workpieces are moved through a predetermined portion of said path and the clamping elements release the workpieces past said predetermined portion of the path; stationary welding means comprising a cutter blade adjacent to said predetermined portion of the path and extending into said gap for forming a cut through the workpieces and for simultaneously heat-sealing the workpieces at both sides of the cut; and stationary cooling means adjacent to said predetermined portion of the path and located past said welding means for cooling the heat-sealed portions of the workpieces.

4. An apparatus for cutting through and for simultaneously welding the end portions of tubular workpieces consisting of heat-sealable thermoplastic material, said apparatus comprising, in combination, means for supporting and for consecutively moving the workpieces in a predetermined path; means for consecutively feeding the workpieces to said supporting means, said feeding means comprising a stationary holder, a gripping jaw pivoted to and defining with said holder a space located in said path for receiving a workpiece, and resilient means for releasably biasing said jaw into engagement with the workpiece in said space; stationary welding means comprising a cutter blade extending into said path for forming a cut through the workpieces and for simultaneously heat-sealing the workpieces at both sides of the cut; and stationary cooling means adjacent to said path and located past said welding means for cooling the heat-sealed portions of the workpieces.

5. An apparatus for cutting through and for simultaneously welding the end portions of tubular workpieces consisting of heat-sealable thermoplastic material, said apparatus comprising, in combination, a pair of closely adjacent concentric disks for supporting and for consecutively moving the workpieces in a circular path, said disks defining between themselves a gap and each formed with transversely aligned peripheral recesses for removably receiving the workpieces; frame means for rotatably supporting said disks; means for driving said disks at the same rotational speed; a plurality of spring-biased retaining means mounted on each of said disks and each comprising a clamping element extending into one of said recesses for releasably retaining a workpiece therein; cam means mounted in said frame means for operating said retaining means in a predetermined sequence; stationary welding means comprising a cutter blade adjacent to said circular path and extending into said gap for forming a cut through the workpieces and for simultaneously heat-sealing the workpieces at both sides of the cut; and stationary cooling means adjacent to said path and located past said welding means for cooling the heat-sealed portions of the workpieces.

References Cited in the file of this patent

UNITED STATES PATENTS

| | | |
|---|---|---|
| 2,707,985 | Binnall | May 10, 1955 |
| 2,781,079 | Ruby et al. | Feb. 12, 1957 |
| 2,786,511 | Reid | Mar. 26, 1957 |
| 2,805,700 | Klasing et al. | Sept. 10, 1957 |